United States Patent
Henriksson

(10) Patent No.: US 6,940,263 B2
(45) Date of Patent: Sep. 6, 2005

(54) TESTING A TRANSCEIVER

(75) Inventor: Markku Henriksson, Oulu (FI)

(73) Assignee: Nokia Corporation, Espoo (FI)

( * ) Notice: Subject to any disclaimer, the term of this patent is extended or adjusted under 35 U.S.C. 154(b) by 3 days.

(21) Appl. No.: 10/344,098

(22) PCT Filed: Aug. 9, 2001

(86) PCT No.: PCT/FI01/00704

§ 371 (c)(1),
(2), (4) Date: Aug. 11, 2003

(87) PCT Pub. No.: WO02/13427

PCT Pub. Date: Feb. 14, 2002

(65) Prior Publication Data
US 2004/0037353 A1 Feb. 26, 2004

(30) Foreign Application Priority Data
Aug. 10, 2000 (FI) .............................. 20001774

(51) Int. Cl.$^7$ .......................... H04Q 1/20; G01R 23/00; H04B 17/00; H04B 1/40
(52) U.S. Cl. .................... 324/76.19; 375/224; 375/219; 455/67.14; 455/88; 455/550.1
(58) Field of Search ................................ 455/67.11, 88, 455/76, 550.1, 67.14; 324/76.11, 76.19, 76.23; 375/224–228, 219–221, 246, 296, 222, 279, 284–285, 308; 370/241; 331/37, 40, 41

(56) References Cited

U.S. PATENT DOCUMENTS

| | | | |
|---|---|---|---|
| 4,048,564 A | * | 9/1977 | Gleeson, Jr. .............. 324/76.12 |
| 4,310,803 A | | 1/1982 | Kurihara et al. ............ 328/167 |
| 4,940,950 A | | 7/1990 | Helfrick ......................... 331/2 |
| 5,109,535 A | | 4/1992 | Kume et al. ............... 455/67.4 |
| 5,307,029 A | * | 4/1994 | Schenk ......................... 331/37 |
| 5,604,728 A | * | 2/1997 | Jylha .......................... 370/241 |
| 5,751,114 A | * | 5/1998 | Dingsor ...................... 375/222 |
| 5,937,335 A | * | 8/1999 | Park et al. .................... 455/86 |
| 6,028,850 A | * | 2/2000 | Kang ......................... 370/320 |
| 6,061,575 A | * | 5/2000 | Lombardi ................ 455/552.1 |
| 6,208,621 B1 | * | 3/2001 | Ducaroir et al. ............ 370/241 |
| 6,404,293 B1 | * | 6/2002 | Darabi et al. ................. 331/37 |
| 6,738,601 B1 | * | 5/2004 | Rofougaran et al. ....... 455/66.1 |

FOREIGN PATENT DOCUMENTS

| | | |
|---|---|---|
| EP | 0 825 734 A3 | 2/1998 |
| FI | 85082 | 11/1991 |
| JP | 2000-004204 | 1/2000 |
| WO | WO 01/06685 A1 | 1/2001 |

* cited by examiner

Primary Examiner—Anjan Deb
Assistant Examiner—Jeff Natalini
(74) Attorney, Agent, or Firm—Squire, Sanders & Dempsey L.L.P.

(57) ABSTRACT

The invention relates to a method and an arrangement implementing the method for testing a transmitter part and receiver part in a transceiver. A signal in the transmitter part is mixed with a mixing signal for generating a signal to be connected to the receiver part, which generated signal is connected to the receiver part and the connected signal is compared with the transmitter part signal to test the transceiver. The mixing signal is generated by connecting a signal generated by means of a signal generator used in the operation of the transmitter part and/or receiver part to at least two signal branches, dividing the signal in the signal branches into at least two signals of different frequencies in the different signal branches, and generating a mixing signal from the signals of different frequencies.

22 Claims, 10 Drawing Sheets

TESTING A TRANSCEIVER

FIELD OF THE INVENTION

The invention relates to a method and an arrangement implementing the method for testing a transceiver in a radio system.

BACKGROUND OF THE INVENTION

Identification of errors in transceiver operation, both in transmitter and receiver operation, constitutes an important part when a reliable data transmission is secured in a radio system. Testing a transceiver in a centralized manner allows the radio system to identify such errors.

FIG. 1 illustrates a prior art solution for testing a transceiver. The transceiver comprises a transmitter part 100, a receiver part 102, a joint synthesizer 104 for the transmitter part and the receiver part, a duplex filter 106 for the signal to be transmitted and received and an antenna 108. Another possible alternative is the one in which the transmitter part and the receiver part both comprise a separate synthesizer. The transceiver also comprises a prior art testing implementation in which a test synthesizer 110 is used to generate a signal for testing. The signal is mixed in a mixer 112 with the transmitter part signal, which is connected through a connection 114 to the mixer 112 with the desired power. The result of the mixing is a receiving frequency signal, which is attenuated using an attenuator 116 to a desired power level. The receiving frequency signal is connected through a connection 118 to the receiver part. The transmitter signal and the signal connected to the receiver part are compared to one another in a comparing unit 120 in order to test the transceiver. The comparing unit may be a processor-based testing apparatus such as a computer. In a base station implementation the comparing unit is typically a microcircuit. Furthermore, the prior art solution comprises a software unit 122, which carries out required controls, such as controlling the operation of the test synthesizer 110 and the attenuator 116.

A drawback with the prior art solution is that a separate test synthesizer 110 is required for generating the signal to be mixed with the transmitter part signal. The separate test synthesizer and the complexity of the structure that is required thereof are economically expensive. Another drawback with the prior art solution is that it is difficult to integrate the presented testing implementation to the transceiver, which is a result of the difficulty involved with the integration of the loop filter included in the test synthesizer and the voltage oscillator.

BRIEF DESCRIPTION OF THE INVENTION

It is an object of the invention to provide a method and an arrangement implementing the method in such a manner that the testing implementation of the transmitter and receiver can easily be integrated and is economically advantageous. This is achieved with the method for testing a transmitter part and a receiver part in a transceiver, where a signal of the transmitter part is mixed with a mixing signal for generating a signal to be connected to the receiver part. The generated signal is connected to the receiver part and the connected signal is compared with the transmitter part signal to test the transceiver. In this method the mixing signal is generated by connecting a signal generated by means of a signal generator used in the operation of the transmitter part and/or receiver part to at least two signal branches, dividing the signal in the signal branches into at least two signals of different frequencies in the different signal branches, and generating a mixing signal from the signals of different frequencies.

The invention also relates to an arrangement for testing a transmitter part and receiver part in a transceiver. The arrangement comprises at least one signal generator to be used in the operation of the transmitter part and the receiver part, a first mixer for mixing the signal of the transmitter part with a mixing signal, the mixing generating a signal that is connected to the receiver part, and a comparing unit for comparing the signal connected to the receiver part with the transmitter part signal for testing the transceiver. The arrangement comprises a connection through which the signal generated in the signal generator is connected to a first signal branch and to at least one other signal branch, at least one divider in the first signal branch and at least one divider in at least one other signal branch for dividing the signal connected from the signal generator into at least two signals of different frequencies in the different signal branches, and a second mixer for mixing at least two signals of different frequencies into a mixing signal.

The invention is based on the idea that a signal generated in a signal generator used in the transceiver operation is divided into at least two signals of different frequencies, which are mixed into a mixing signal for testing the transceiver.

The solution of the invention does not require a separate test synthesizer to carry out testing. The signal that is divided into at least two signals of different frequencies is generated in a signal generator, which is common to both the transmitter part and the receiver part of the transceiver. Alternatively, if the transmitter part and receiver part both have separate signal generators then the signal is generated in the signal generator of the transmitter part or the receiver part. A test signal generated using the solution of the invention may include some non-ideal features, such as frequency deviations, which alleviate the implementation of the solution of the invention. On account of the above the solution of the invention can more easily be integrated into the transceiver and requires less space than the prior art solutions. The solution of the invention enables the electronics required in testing to be directly integrated into a microcircuit. The solution of the invention is also economically advantageous to implement.

BRIEF DESCRIPTION OF THE DRAWINGS

In the following the invention will be described in greater detail by means of the preferred embodiments with reference to the accompanying drawings, in which.

DETAILED DESCRIPTION OF THE INVENTION

Figure 1:
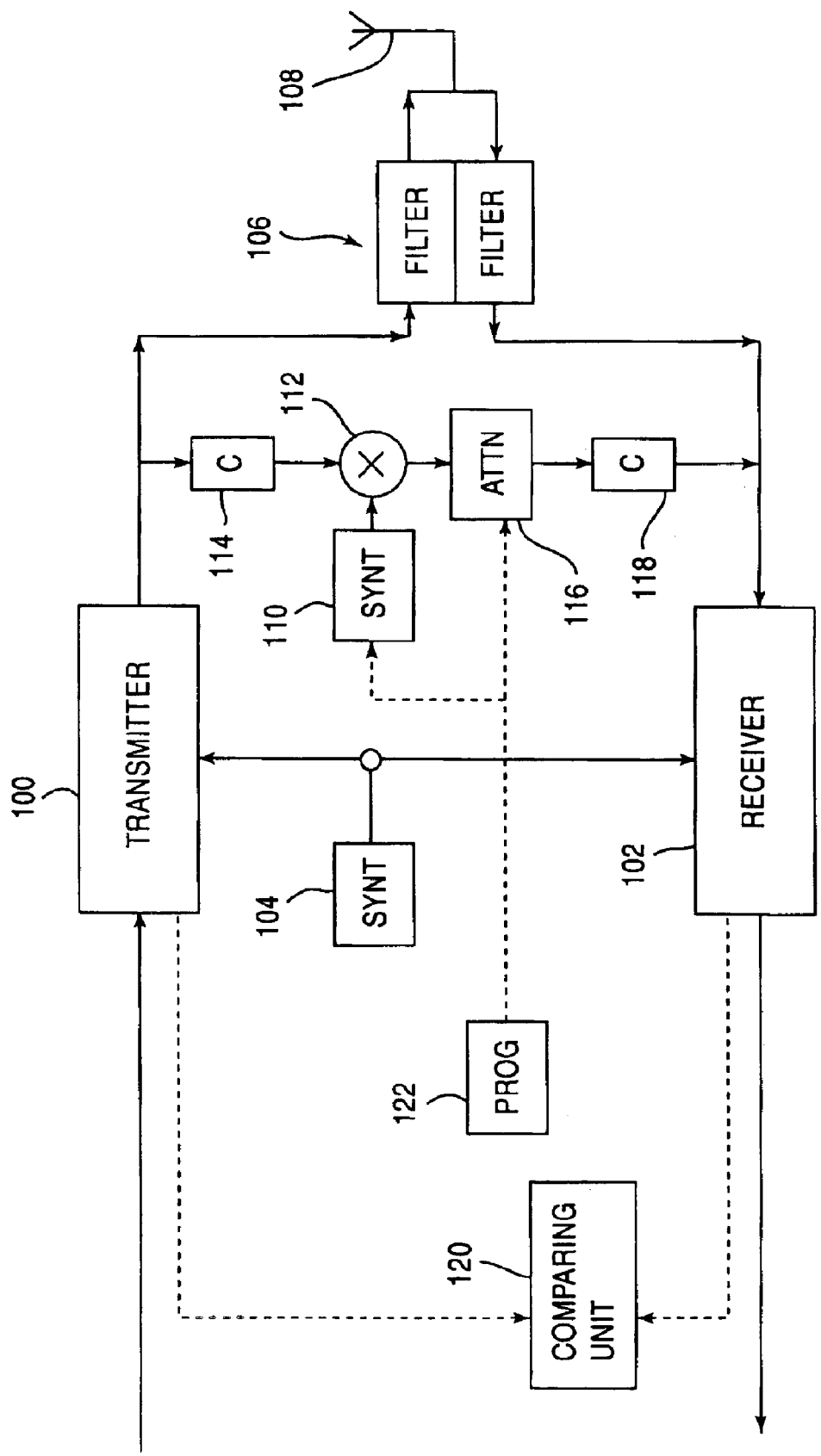
FIG. 1 shows the prior art solution described above.
Figure 2:
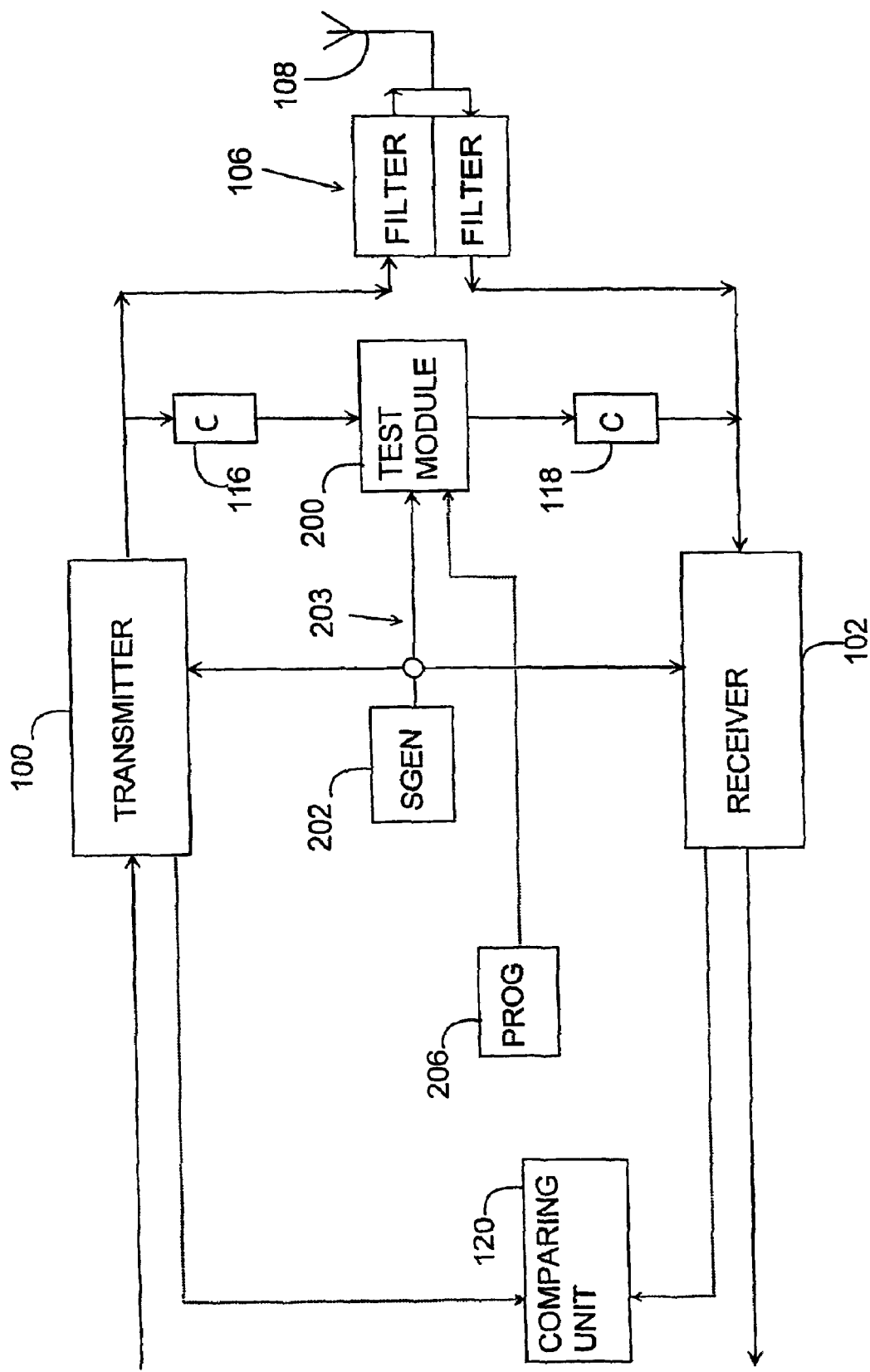
FIG. 2 shows a solution of the invention in a first transceiver implementation.

A transceiver shown in FIG. 2 comprises a transmitter part 100 and a receiver part 102. The transceiver comprises a signal generator 202, which is common to the transmitter part and the receiver part and which is used to generate a desired frequency for the signal to be transmitted in the transmitter part and correspondingly to generate a desired frequency for the signal to be received in the receiver part. The signal generator is typically a synthesizer, for example an RF (Radio Frequencies) synthesizer used in radio frequency applications. In an alternative solution, the transmitter part and the receiver part both include a separate signal generator for generating the signals of desired frequencies.

Figure 3:
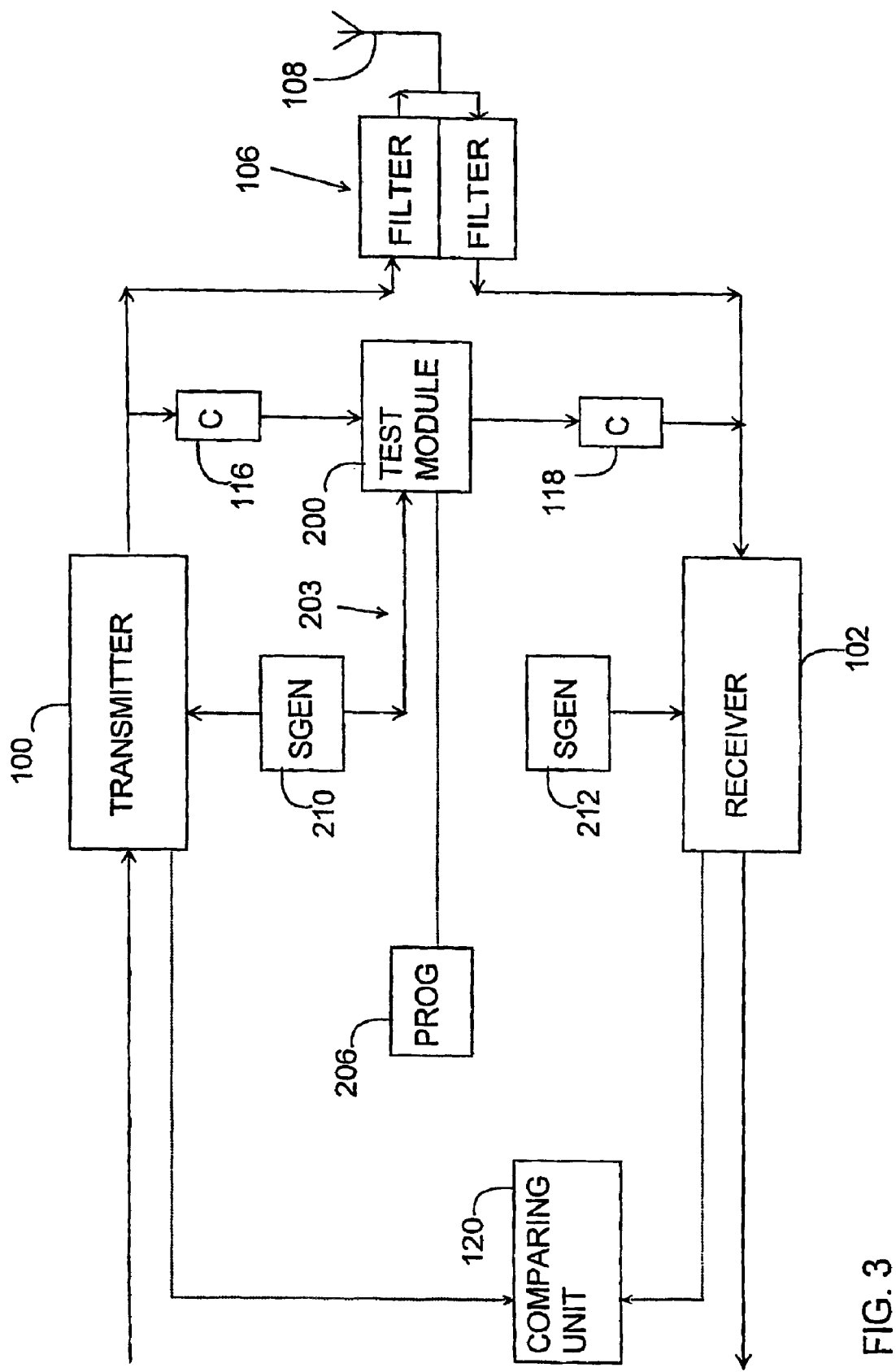
FIG. 3 shows the solution of the invention in a second transceiver implementation.

FIG. 2 shows an example of the solution of the invention for testing the transceiver, in which the signal generated in the transmitter part 100 is connected through a connection 116 with a desired power to a test unit 200. The signal generator 202 generates a signal, which is connected to the test unit. If a transceiver implementation of the invention is concerned, in which both the transmitter part and the receiver part have separate signal generators, then the signal to be connected to the test unit is either a signal generated in the signal generator of the transmitter part or a signal generated in the signal generator of the receiver part. FIG. 3 shows an example of the transceiver implementation, in which the transmitter part 100 employs a signal generator 210 and the receiver part 102 employs a signal generator 212. In the implementation shown in Figure 3, the signal is connected to the test unit for testing from the signal generator 210 of the transmitter part 100 through a connection 203. The same procedure can also be carried out from the signal generator 212 of the receiver part 102. The transceiver implementation of the invention can also be carried out for example in such a manner that both the signal generator of the transmitter part and the signal generator of the receiver part have a connection through a switch to the test unit. When the switch is used for connecting, then the signal generated in the signal generator of the transmitter part or the signal generated in a signal generator of the receiver part is selected to be connected to the test unit as the signal required in testing the transceiver.

Figure 4:
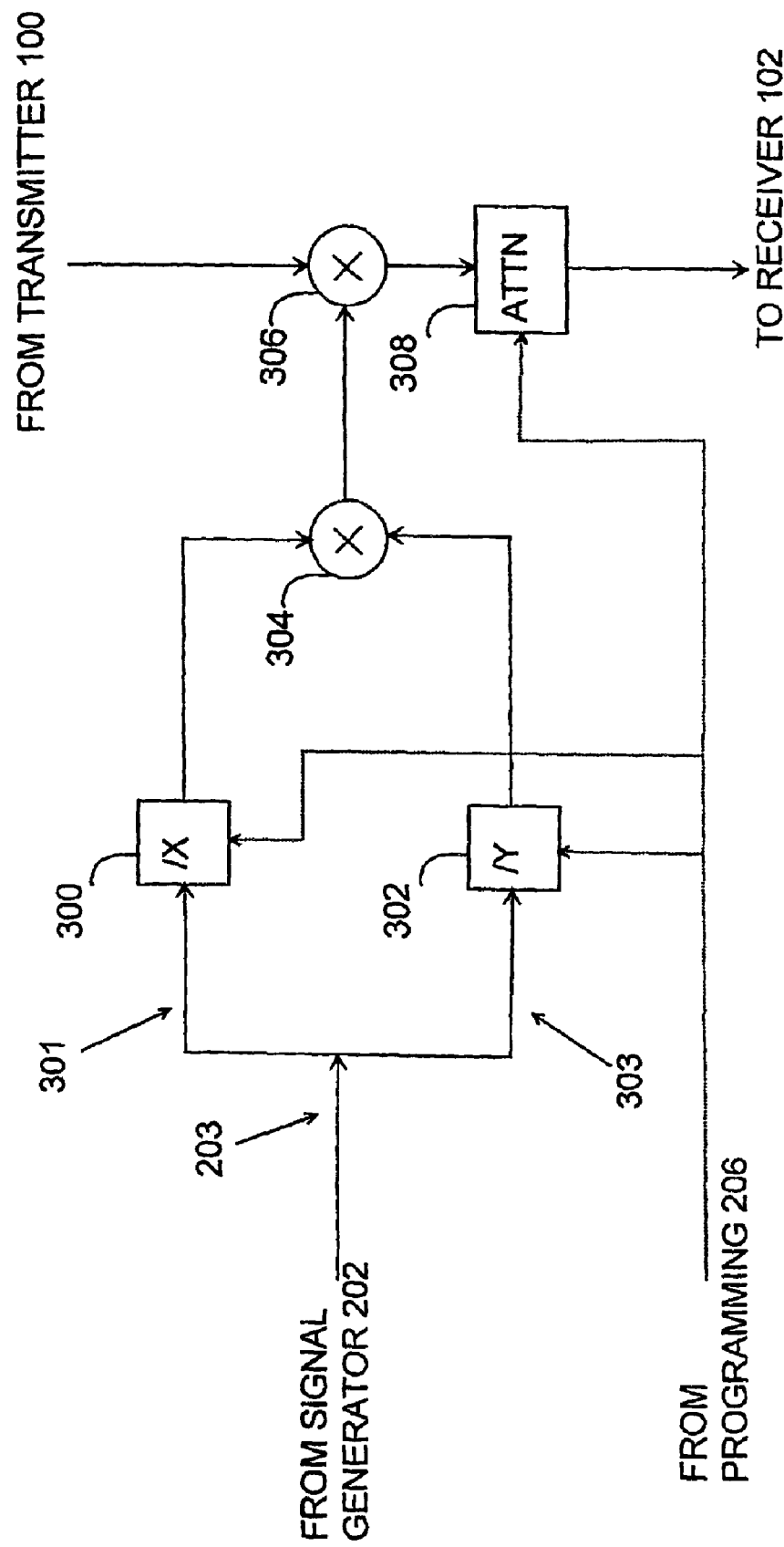
FIG. 4 shows a test unit in the solution of the invention.

FIG. 4 shows the structure of the test unit of the invention. The signal generated in the signal generator 202 is connected through the switch 203 to the test unit and into at least two signal branches in the test unit, where the signal is divided in such a manner that signals of different frequencies are generated in the different signal branches. In the test unit shown in FIG. 4 the signal is divided into two signal branches, in which first signal branch 301 the signal is divided using a divider 300 of the first signal branch and in a second signal branch 303 the signal is divided using a divider 302 of the second signal branch. The divider of the first signal branch and the divider of the second signal branch vary in size, and therefore the signal generated to the first signal branch as a quotient is of a different frequency than the signal generated to the second signal branch as a quotient. The signals of different frequencies generated as quotients are mixed using a first mixer 304 to a mixing signal. The mixing signal is mixed using a second mixer 306 with the transmitter part signal. In such a mixing the transmitter part signal is transferred to a receiving frequency as a receiving frequency signal. If necessary the receiving frequency signal can be attenuated to a desired power level using an attenuator 308.

With reference to FIG. 2 the receiving frequency signal is connected through a switch 118 provided with a desired power to the receiver part 102. The signal connected to the receiver part is compared with the transmitter part signal in a comparing unit 120 in order to test the transceiver. The comparing unit may be a processor-based apparatus such as a computer, or a measuring device such as an oscilloscope. Alternatively, the comparing unit may also be both a processor-based apparatus and a measuring device. Typically in base station applications the comparing unit 120 is a microcircuit that compares the signals in digital mode. The comparison is carried out using known methods.

A programming unit 206 shown in FIG. 2 can be used to program the operation of the test unit 200 as desired. The programming unit can also be used to control the operation of the divider 300 of the first signal branch 301 and the divider 302 of the second signal branch 303 as well as the attenuator 308 shown in FIG. 4. When the transceiver is used in a conventional manner the switches 116, 118 shown in FIG. 2 can be employed to disconnect the test unit from the transceiver, in order for the test unit not to interfere with the standard operation of the transceiver. In other respects FIG. 2 shows the standard features associated with the operational environment of the transceiver, i.e. a duplex filter 106 and an antenna 108.

Figure 5:
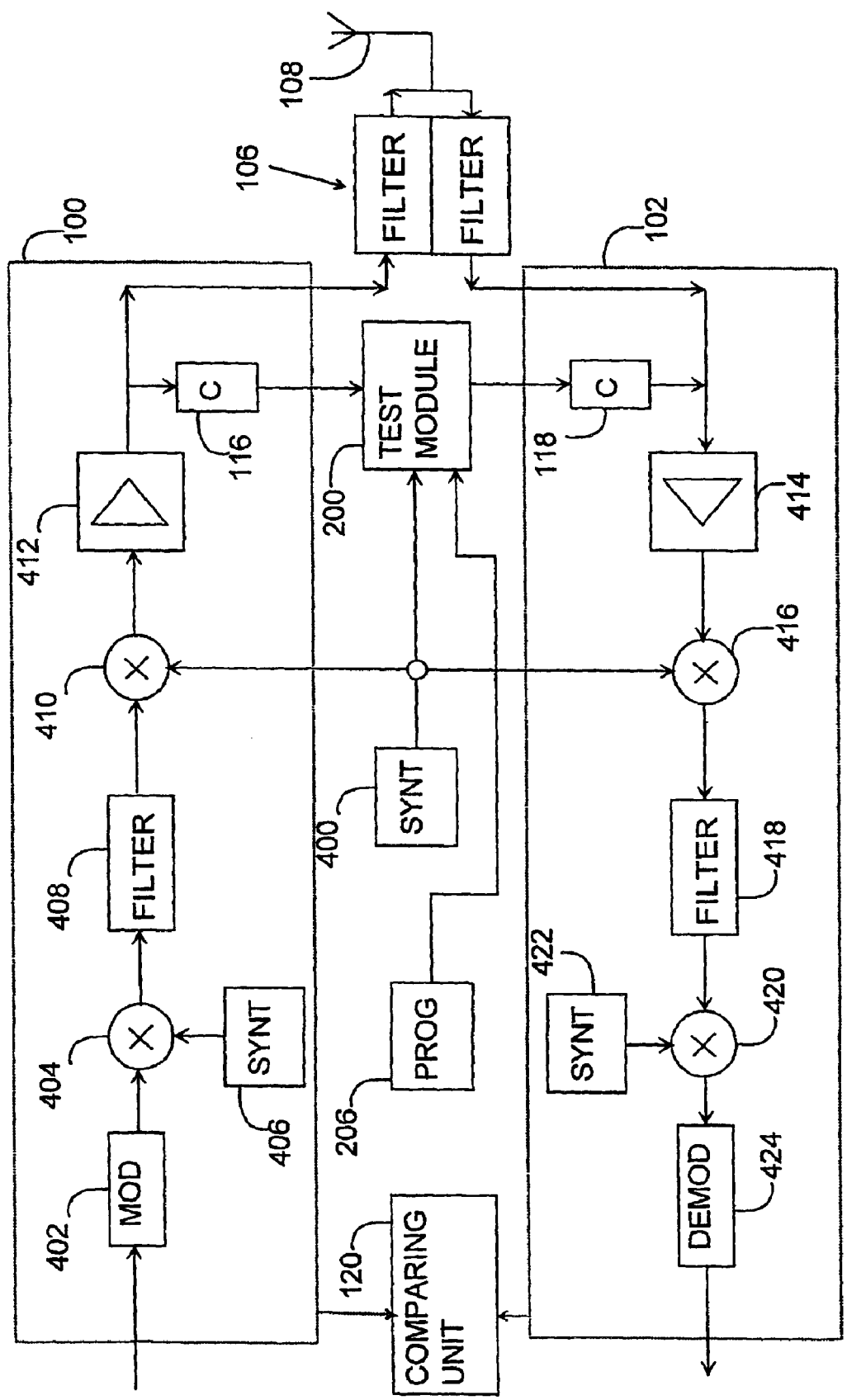
FIG. 5 shows a first preferred embodiment of the invention.

In the first preferred embodiment of the invention shown in FIG. 5, the transceiver is tested. The transmitter part 100 and the receiver part 102 are integrated into a transceiver in such a maimer that the transceiver comprises an RF synthesizer 400, which is common to the transmitter part and the receiver part and which is used to generate a desired frequency for the signal to be transmitted in the transmitter part and correspondingly to generate a desired frequency to the signal to be received in the receiver part. The signal generated in the RF synthesizer is also used as the signal required in testing the transceiver. The transceiver implementation may also be such that the transmitter part and the receiver part both have separate RF synthesizers, in which case the signal required for testing is a signal generated in the RF synthesizer of the transmitter part or a signal generated in the RF synthesizer of the receiver part. In addition, the transceiver comprises the duplex filter 106 and the antenna 108 for the signal to be transmitted and received. In the transmitter part the signal is modulated using a modulator 402, and thereafter the transmitter part signal is mixed using a mixer 404 with an intermediate frequency signal generated using an IF (Intermediate Frequencies) synthesizer 406 for mixing the transmitter signal to an intermediate frequency range. The intermediate frequency signal of the transmitter is filtered using a filter 408. The radio frequency signal generated in the RF synthesizer 400 common to the transmitter part and the receiver part is mixed using a mixer 410 with the intermediate frequency signal of the transmitter part in order to mix the transmitter part signal to a radio frequency signal, whereafter the radio frequency signal of the transmitter part is amplified using a power amplifier 412.

Figure 6:
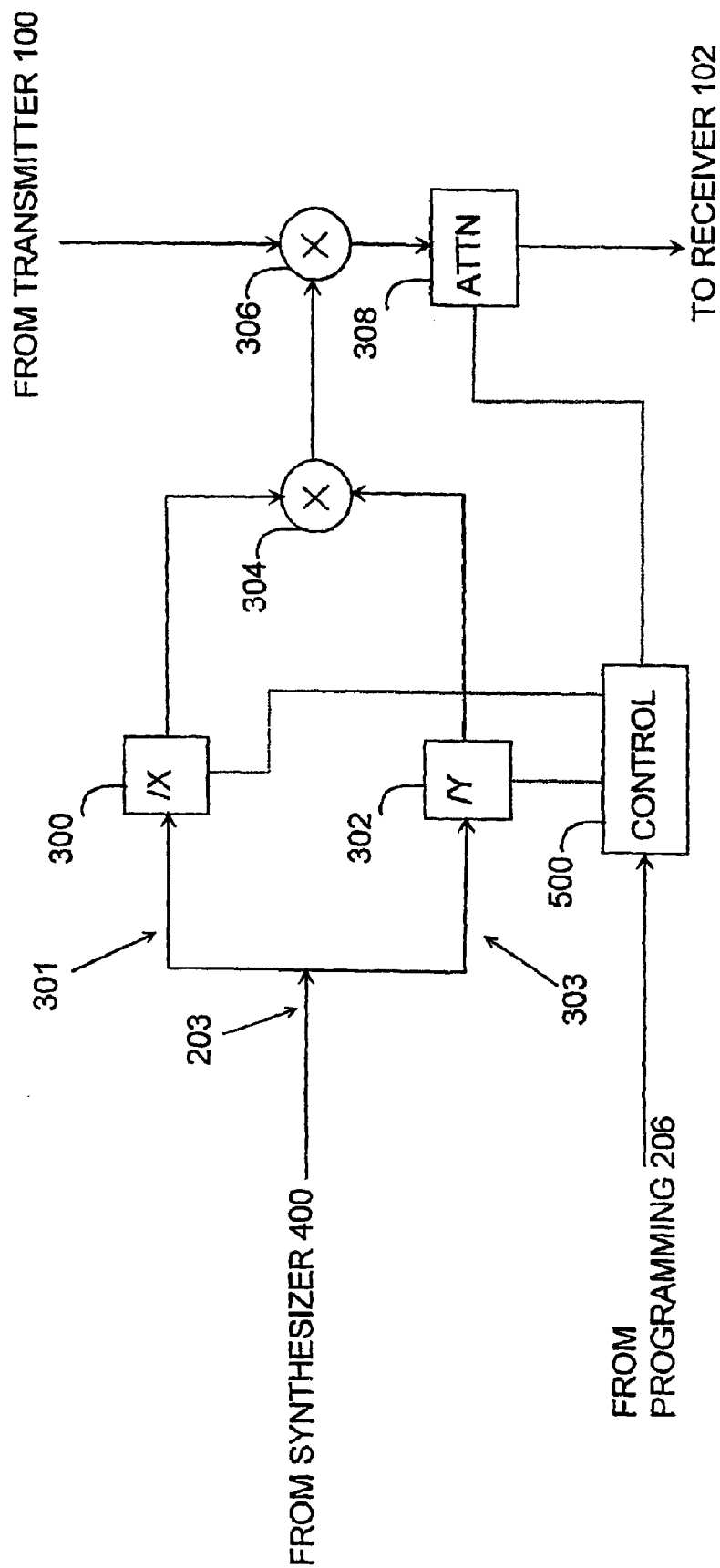
FIG. 6 shows a test unit according to the first preferred embodiment of the invention.

A signal provided with a desired power is connected from the amplified signal of the transmitter part 100 through the switch 116 to the test unit 200. The radio frequency signal generated in the RF synthesizer 400 common to the transmitter part and the receiver part is transmitted to the test unit. FIG. 6 shows how the transceiver of the test unit 200 is tested. The RF synthesizer 400 common to the transmitter part and the receiver part is used to connect a signal to the divider 300 of the first signal branch 301 and to the divider 302 of the second signal branch 303. The test unit in FIG. 6 differs from the test unit showed in FIG. 4 in that the test unit may comprise a control unit 500 for controlling the programming of the divider 300 of the first signal branch, the divider 302 of the second signal branch and the attenuator 308 to be carried out using the programming unit 206 (FIG. 2). Otherwise the test unit shown in FIG. 6 is used to generate a receiving frequency signal from the transmitter part signal in the same way as shown in FIG. 4. The programmable attenuator 308 is used to adjust the power of the receiving frequency signal to a desired level, which typically means such an adjustment that the attenuation caused by the test unit 200 remains stable. In addition the programmable attenuator 308 can be utilized to check how the measuring of the power level of the signal connected to the receiver part operates or how the adjustment of the automatic amplification operates. The power level is typically measured in the comparing unit 120, in other words what is concerned is the checking of how the comparing unit operates in the checking mentioned above. The programmable attenuator can further be utilized to measure the sensitivity that is also typically carried out in the comparing unit.

With reference to FIG. 5 the receiving frequency signal is connected to the receiver part 102 through the switch 118. The signal is amplified in the receiver part using a receiver amplifier 414, and thereafter the signal is mixed using a mixer 416 with the radio frequency signal generated in the RF synthesizer 400 common to the transmitter part and the receiver part as shown in FIG. 5 or with the radio frequency signal generated in the separate RF synthesizer of the receiver part. After the above mixing, the signal to be received is filtered with a filter 418. The filtered signal is mixed using a mixer 420 with an intermediate signal generated in an IF synthesizer 422 for mixing the signal connected to the receiver part to an intermediate signal, which is demodulated using a demodulator 424. A corresponding comparing unit 120 shown in FIG. 2 is used to compare the signal connected to the receiver part with the transmitter part signal to test the transceiver. Signals that can be compared with one another can be conveyed to the comparing unit from the desired locations in the transmitter part and the receiver part. For example, an original transmitter part signal, i.e. the transmitter part signal before modulation, and a signal demodulated from the receiver part can be conveyed to the comparing unit to be compared with one another.

Figure 7:
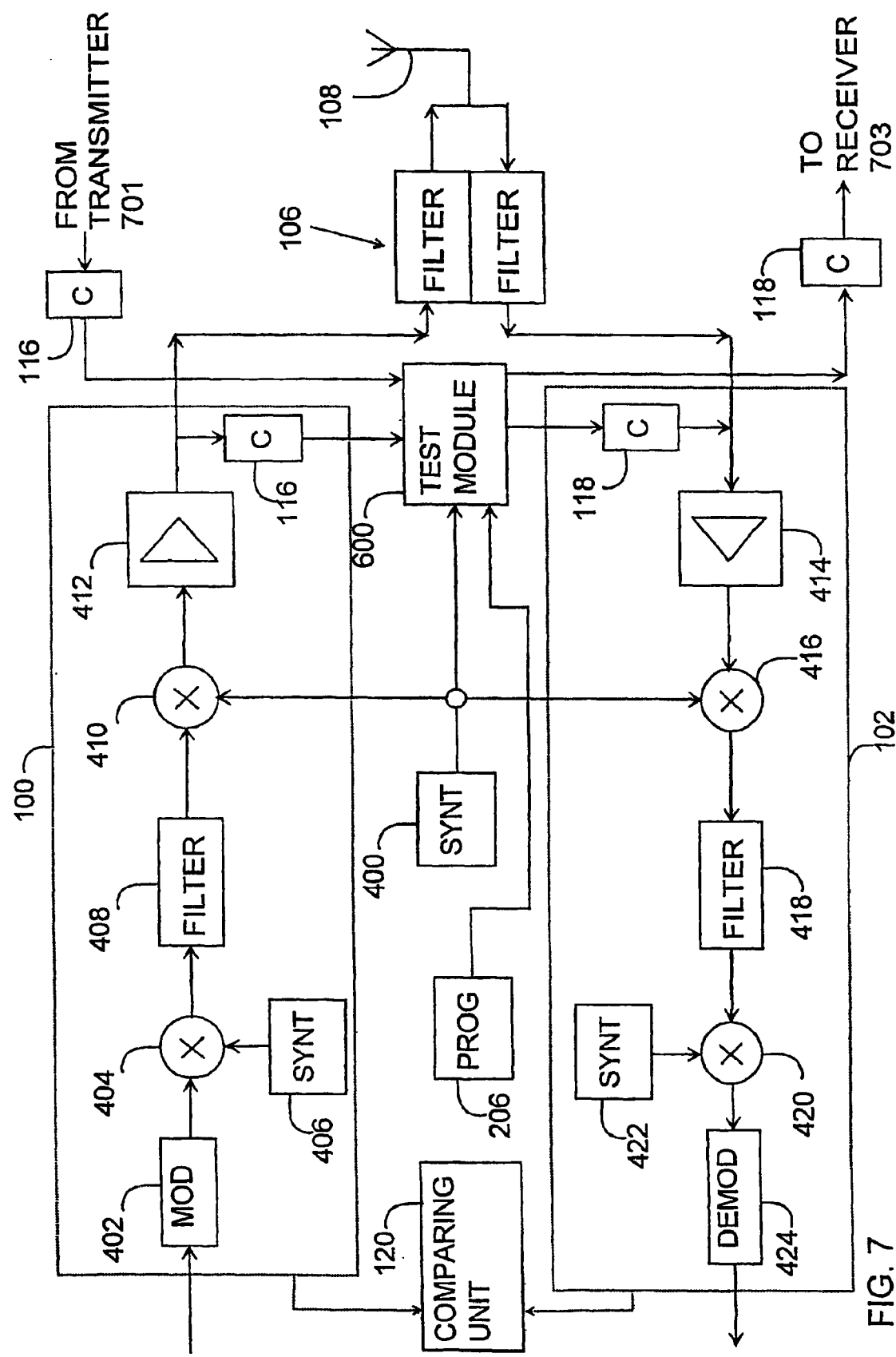
FIG. 7 shows a second preferred embodiment of the invention.
Figure 8:
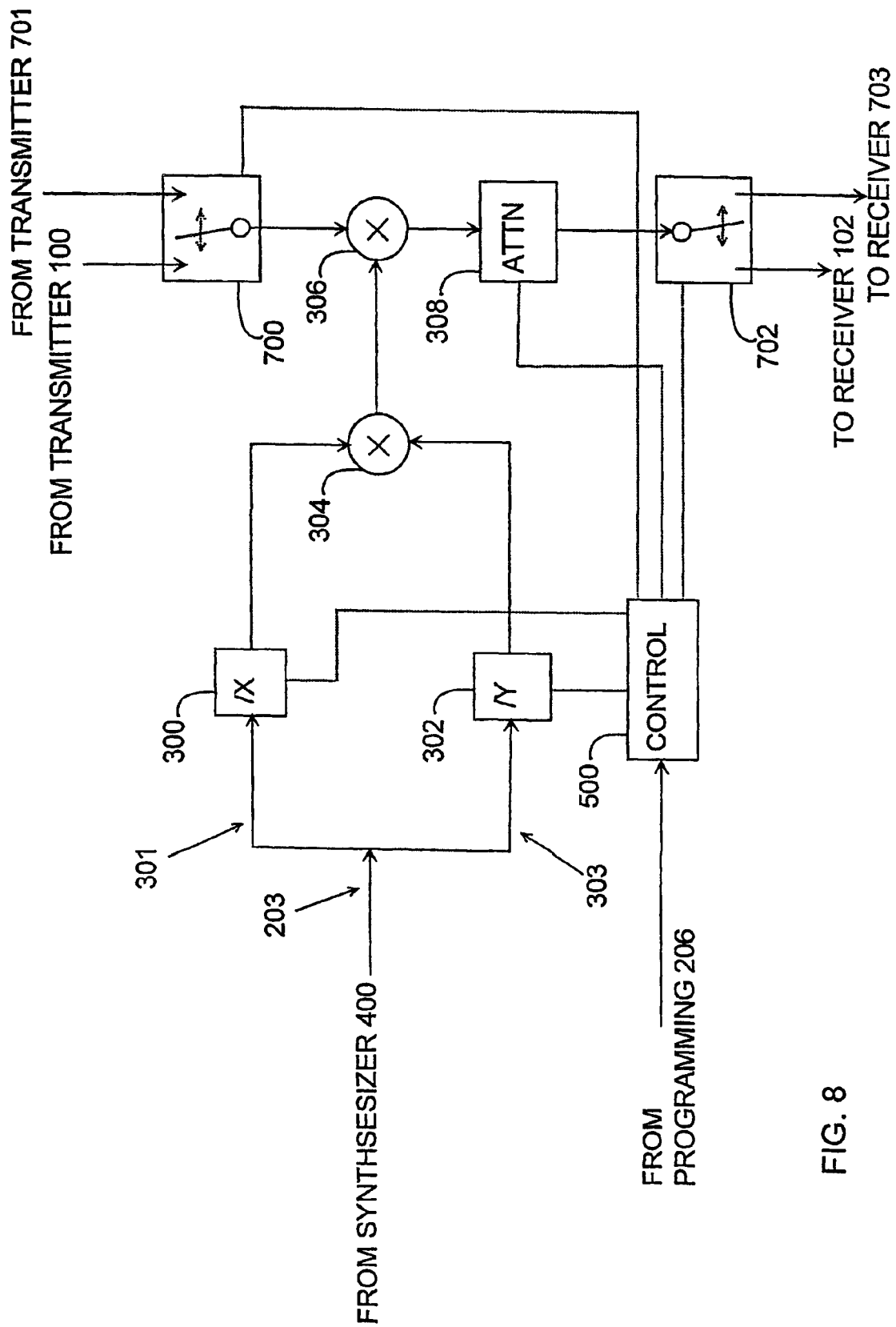
FIG. 8 shows a test unit according to the second preferred embodiment of the invention.

In the second preferred embodiment of the invention shown in FIG. 7 the same test unit 600 can be used to test two transceivers. The structure of the test unit 600 is shown in FIG. 8. A switch 700 on the transmitter side can be used to select the transmitter part 100, 701 of either transceiver for testing. Correspondingly, a switch 702 on the receiver side can be used to select the receiver part 102, 703 of either transceiver for testing. The transceivers can therefore also be tested crosswise in the second preferred embodiment of the invention so that the transmitter part 100 of the first transceiver is tested with the receiver part 703 of the second transceiver or the transmitter part 701 of the second transceiver is tested with the receiver part 102 of the second transceiver. The testing of more than two transceivers can be implemented in a corresponding manner. The transmitter part 701 and the receiver part 703 of the second transceiver shown in FIG. 7 may be similar to the transmitter part 100 and the receiver part 102 of the first transceiver shown in FIG. 7.

In other respects the second preferred embodiment of the invention shown in FIGS. 7 and 8 may comprise the same features as shown in FIGS. 5 and 6.

Figure 9:
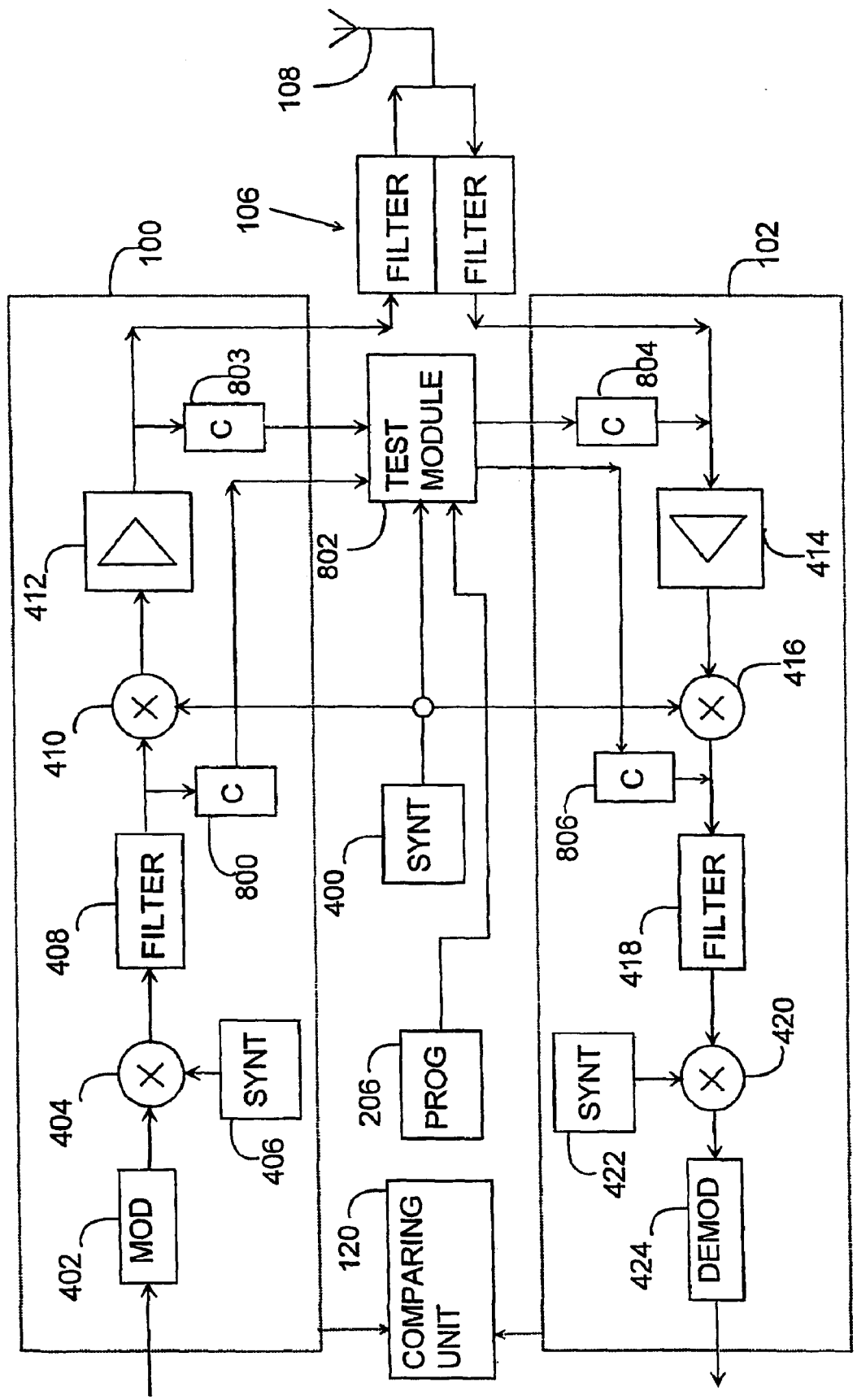
FIG. 9 shows a third preferred embodiment of the invention.
Figure 10:
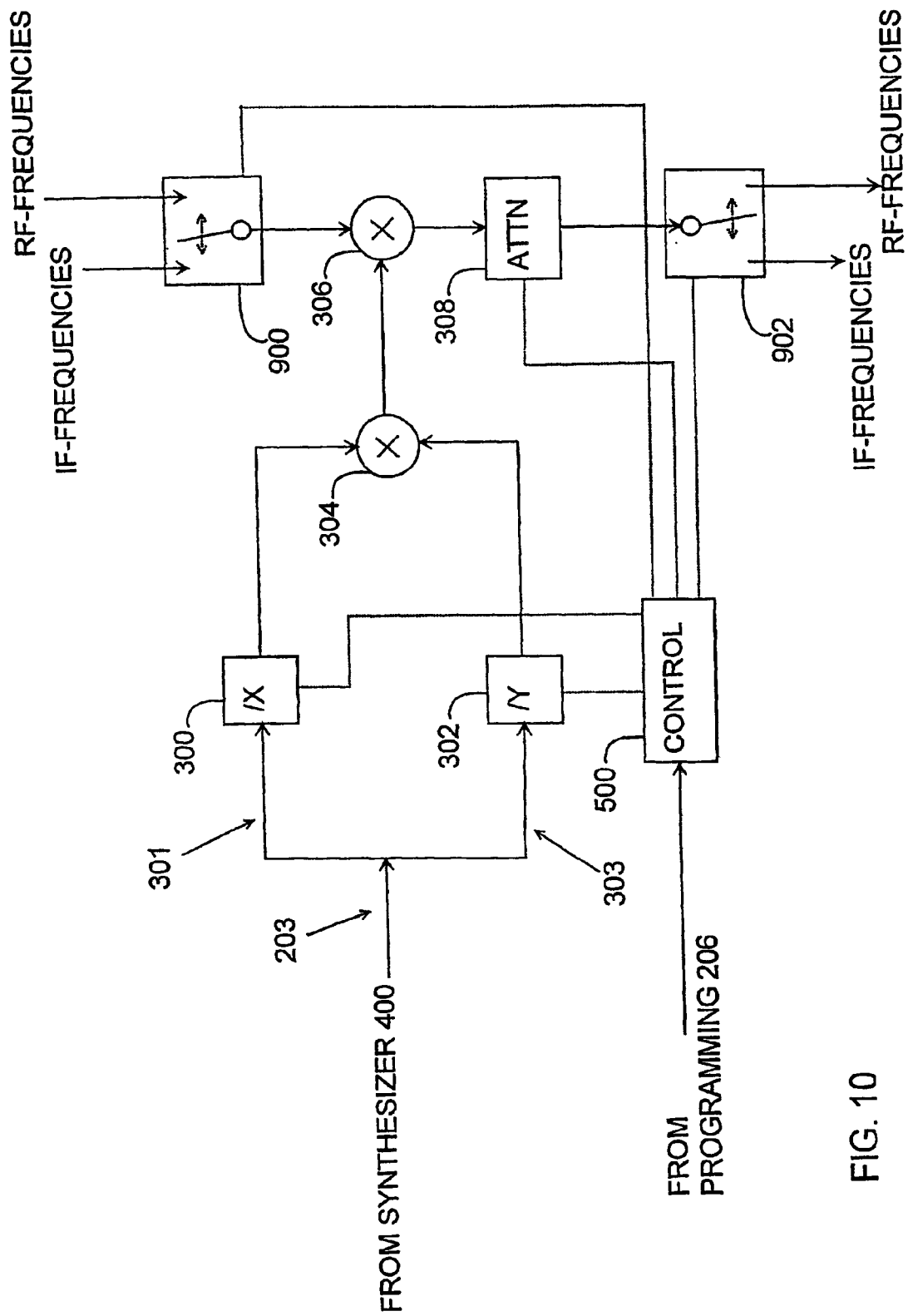
FIG. 10 shows a test unit according to the third preferred embodiment of the invention.

In the third preferred embodiment of the invention shown in FIG. 9 the transceiver is tested at radio frequencies and intermediate frequencies. An intermediate frequency signal of the transmitter part is connected from the transmitter part 100 through a switch 800 to a test unit 802 typically after the filter 408 before mixing it to the radio frequencies. The radio frequency signal is connected with a desired power through a switch 803 to the test unit typically using the power amplifier 412 after the amplification. FIG. 10 shows how the transceiver in the test unit 802 is tested at radio frequencies and intermediate frequencies. A switch 900 on the transmitter side can be used to connect a radio frequency signal of the transmitter part or an intermediate frequency signal of the transmitter part for testing. If the switch on the transmitter side is used to connect a radio frequency signal of the transmitter part for testing, then a switch 902 on the receiver side can be used to connect the radio frequency signal on the receiver side to the signal path thereof, which typically refers to the signal path shown in FIG. 9 through the switch 804 to the receiver part 102 before amplification is carried out using the receiver amplifier 414. If the switch 900 on the transmitter side is used to connect an intermediate signal of the transmitter part for testing, then the switch 902 of the receiver side can be used to connect the intermediate signal on the receiver side to the signal path thereof, which typically refers to the signal path shown in FIG. 9 through the switch 806 to the receiver after the mixer 416 before the filter 418. The preferred embodiments of the invention shown in FIGS. 7 and 8, as well as FIGS. 9 and 10 can also be combined in such a manner that the same testing entity can be used to test more than one transceivers as shown in FIGS. 7 and 8, and also at radio frequencies and intermediate frequencies as shown in FIGS. 9 and 10. In other respects the preferred embodiment of the invention shown in FIGS. 9 and 10 may comprise corresponding features as shown in FIGS. 5 and 6.

Next an implementation example illustrates how the transceiver of the invention shown in FIGS. 5 and 6 can be tested in practice. The common features in the implementation example are through FIGS. 5 and 6 also associated with the preferred embodiments of the invention shown above. With reference to FIG. 5, the transmission frequency range of the transmitter part is between 925 MHz and 960 MHz. The frequency range of the RF synthesizer 400 common to the transmitter part 100 and the receiver part 102 is between 800 MHz and 835 MHz. With reference to FIG. 6, a signal fx having for example a frequency of approximately 47 MHz is generated in the test unit 200 from the signal connected from the RF synthesizer 400 using the divider 300 of the first signal branch 301. The divider 302 of the second signal branch 303 in the test unit is used to generate a signal fy having for example a frequency of approximately 2 MHz from the signal connected from the RF synthesizer. The signals fx and fy are mixed in the test unit using the mixer 304, and a mixing signal is generated as a result of the mixing. If the frequencies of the signals to be mixed are the ones presented above, approximately 47 MHz and approximately 2 MHz, the frequency of the mixing signal may for example be approximately 45 MHz. The mixing signal is mixed using the mixer 306 with the signal connected from the transmitter part for generating a receiving frequency signal. As regards the above frequencies, a signal having for example a frequency of approximately 880 MHz part is generated as the receiving frequency signal, and the signal is connected to the receiver.

The frequency of the mixing signal and the frequency of the receiving frequency signal may comprise frequency deviations in comparison with ideal frequencies. The frequency deviations are typically so insignificant that the drawbacks thereof can be eliminated for instance in the following way: The filtering area of the filter 418 in the receiver part is broadened so that the frequency deviations can be fitted within the filtering area of the filter. Then the fine adjustment of the frequency of the signal connected to the receiver part for eliminating frequency deviations can be carried out using the demodulator 424 of the receiver part. Another alternative is to perform the fine adjustment of the frequency using the IF synthesizer 422 of the receiver part. The fine adjustment of the frequency can also be carried out in the transmitter part using the modulator 402, in which case the filtering area of the filter 408 in the transmitter part can be broadened as much as the frequency deviations require. The needs for broadening the filtering areas of the filters are typically at the most dozens of kilohertz, and such broadenings of the filtering areas cannot cause any harm in the GSM or WCDMA systems. The fine adjustment of the frequency can also be carried out jointly in the transmitter part and the receiver part, in which case the needs to broaden the filtering areas of the filters 408, 418 are smaller than the fine adjustments of the frequency described above carried out either in the transmitter part or in the receiver part.

The solution of the invention can be used for example in the GSM or WCDMA systems. In the GSM technique, it is preferable to test the transceiver during an empty time slot. In the WCDMA technique, it is preferable to test the transceiver at night or at least when one transceiver is not in use. The above transceiver is typically a base station transceiver both in the GSM and WCDMA technique.

In the transceiver implementation, in which the transmitter part and the receiver part have a separate signal generator, the solution of the invention does not deviate from the embodiments described above in other respects than that the signal to be transmitted to the test unit for testing the transceiver unit is a signal generated in the signal generator of the transmitter part or a signal generated in the signal generator of the receiver part.

The test unit of the invention can be integrated directly into a microcircuit that can easily be connected to the transceiver.

Even though the invention has above been explained with reference to the example in the accompanying drawings, it is obvious that the invention is not restricted thereto but can be modified in various ways within the scope of the inventive idea disclosed in the attached claims.

What is claimed is:

1. A method for testing a transmitter part and a receiver part in a transceiver, the method comprising:

connecting a signal generated by means of a signal generator used in an operation of at least one of a transmitter part and a receiver part to at least two signal branches, dividing the signal in the at least two signal branches into at least two signals having different frequencies in different branches of the at least two signal branches, generating a first mixing signal from the at least two signals having different frequencies, mixing a signal of the transmitter part with the first mixing signal for generating a second mixing signal, connecting the second mixing signal to the receiver part, and comparing said second mixing signal with the signal of the transmitter part to test a transceiver.

2. A method as claimed in claim 1, wherein frequency deviations of the first mixing signal are removed by fine adjusting a frequency of the signal of the transmitter part when modulating the signal of the transmitter part.

3. A method as claimed in claim 1, wherein frequency deviations of the first mixing signal are removed by fine adjusting a frequency of the second mixing signal connected to the receiver part when demodulating the second mixing signal connected to the receiver part.

4. A method as claimed in claim 1, wherein the transceiver is tested at RF frequencies so that an RF frequency signal of the transmitter part is mixed with the first mixing signal for generating an RF frequency signal to be connected to an RF frequency part in the receiver part.

5. A method as claimed in claim 1, wherein the transceiver is tested at IF frequencies so that an IF frequency signal of the transmitter part is mixed with the first mixing signal for generating an IF frequency signal to be connected to an IF frequency part in the receiver part.

6. A method as claimed in claim 1, wherein at least two transceivers are tested.

7. A method as claimed in claim 6, wherein at least two transceivers are tested in such a manner that a transmitter part of a first transceiver is tested with a receiver part of at least one other transceiver and a receiver part of the first transceiver is tested with a transmitter part of at least one other transceiver.

8. A method as claimed in claim 1, wherein the signal generator is a synthesizer.

9. A method as claimed in claim 8, wherein the synthesizer is an RF synthesizer.

10. A method as claimed in claim 1, wherein the step of dividing the signal further comprises dividing the signal using a control unit.

11. A method as claimed in claim 1, wherein an attenuation of the second mixing signal to be connected to the receiver part is controlled using a control unit.

12. An arrangement for testing a transmitter part and a receiver part in a transceiver, the arrangement comprising:

at least one signal generator to be used in an operation of a transmitter part and a receiver part, a connection through which a signal generated in the at least one signal generator is connected to a first signal branch and to at least one other signal branch, at least one divider in the first signal branch and at least one divider in the at least one other signal branch for dividing the signal connected from the at least one signal generator into at least two signals of different frequencies in different signal branches of the first signal branch and the at least one other signal branch, and a mixer for mixing at the least two signals of different frequencies to a mixing signal, a second mixer for mixing a signal of the transmitter part with the mixing signal, the mixing generating a signal connected to the receiver part, and a comparing unit for comparing the signal connected to the receiver part with the signal of the transmitter part for testing a transceiver.

13. An arrangement as claimed in claim 12, wherein the transmitter part comprises a modulator for modulating the signal of the transmitter part, the modulator fine adjusting a frequency of the signal of the transmitter part in order to remove frequency deviations of the mixing signal.

14. An arrangement as claimed in claim 12, wherein the receiver part comprises a demodulator for demodulating the signal of the transmitter part, said demodulator fine adjusting a frequency of the signal of the transmitter part in order to remove frequency deviations of the mixing signal.

15. An arrangement as claimed in claim 12, wherein the arrangement comprises a connection for testing the transceiver at RF frequencies (Radio Frequencies), the connection for testing allowing an RF frequency signal of the transmitter part to be connected to the mixing signal to be mixed for generating a generated signal, and a connection for connecting the generated signal to an RF frequency part in the receiver part.

16. An arrangement as claimed in claim 12, wherein the arrangement comprises a connection for testing the transceiver at IF frequencies (Intermediate Frequencies), the connection for testing allowing an IF frequency signal of the transmitter part to be connected to the mixing signal to be mixed for generating a generated signal, and a connection for connecting the generated signal to an IF frequency part in the receiver part.

17. An arrangement as claimed in claim 12, wherein the arrangement is arranged to test at least two transceivers.

18. An arrangement as claimed in claim 17, wherein the arrangement is arranged to test the at least two transceivers in such a manner that a transmitter part of a first transceiver is tested with at least a receiver part of one other transceiver and a receiver part of the first transceiver is tested with at least a transmitter part of one other transceiver.

19. An arrangement as claimed in claim 12, wherein the arrangement comprises a synthesizer as the at least one signal generator.

20. An arrangement as claimed in claim 19, wherein the synthesizer is an RF synthesizer.

21. An arrangement as claimed in claim 12, wherein the arrangement comprises a control unit for controlling a division of the signal connected from the at least one signal generator to be carried out by dividers.

22. An arrangement as claimed in claim 12, wherein the arrangement comprises a control unit for controlling a attenuation of the signal connected to the receiver part to be received.

* * * * *